May 29, 1945.   H. S. MILLER   2,377,026
METHOD OF DEHYDRATING ALCOHOLS
Filed Oct. 1, 1940
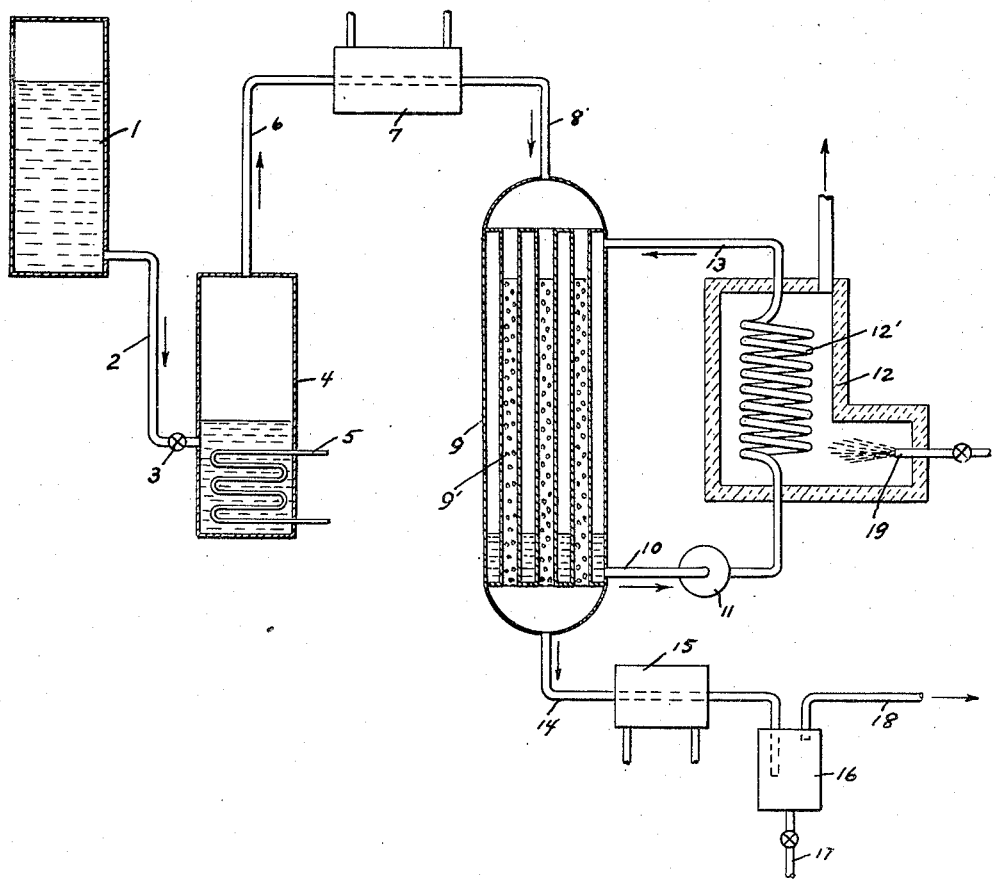
INVENTOR
Hoke S. Miller
BY
Pennie Davis Marvin & Edwards
ATTORNEYS Patented May 29, 1945

2,377,026

UNITED STATES PATENT OFFICE 2,377,026

METHOD OF DEHYDRATING ALCOHOLS

Hoke S. Miller, Stamford, Conn., assignor to Air Reduction Company, Incorporated, New York, N. Y., a corporation of New York Application October 1, 1940, Serial No. 359,237

5 Claims. (Cl. 260—682)

This invention relates to the dehydration of alcohols to produce corresponding olefins, and to an improved catalyst whereby dehydration is effected more satisfactorily and economically.

It is known that olefins can be produced from alcohols by the passage of vapors of the alcohols over aluminum oxide at a temperature of from 350° to 400° C. While aluminum oxide is capable of effecting the desired reaction, it causes, unfortunately, the simultaneous formation of appreciable quantities of hydrogen, saturated hydrocarbons, unsaturated polymers, carbon monoxide and other undesirable impurities such as aldehydes and acids which contaminate the olefin. One of the principal uses of ethylene, for example, is for anaesthesia, and a mere trace of carbon monoxide in the ethylene renders it unfit for such purposes. Consequently alumina cannot be used satisfactorily in the preparation of ethylene for anaesthesia, and the impurities present in ethylene produced by means of alumina catalysts make it unsuitable for many other purposes.

Another method of dehydrating alcohol to produce olefins depends upon the use of coke impregnated with phosphoric acid. This catalyst produces ethylene sufficiently free from carbon monoxide to permit its use in anaesthesia, but the ethylene contains other impurities which must be removed by purification before the gas is employed for that purpose. Furthermore, the yields of olefins produced with the phosphoric acid catalyst are relatively low, the phosphoric acid must be renewed frequently, and corrosion problems are associated with this method which add greatly to its economic disadvantages.

It is the object of the present invention to afford a more efficient and satisfactory method of dehydrating alcohols to produce olefins which are substantially free from carbon monoxide and other impurities, and a catalyst suitable for use in the method and capable of effecting the desired result.

Other objects and advantages of the invention will be apparent as it is better understood by reference to the following specification and the accompanying drawing, in which an apparatus suitable for the practice of the method is diagrammatically illustrated.

I have discovered that a satisfactory catalyst for the dehydration of alcohols consists of a mixture of alumina and silica in the form of a gel. The gel, after being dried, has unpredictable catalytic properties for the dehydration of alcohols, producing higher yields and olefins which are substantially free from contaminating impurities. Such a catalyst may be used continuously over long periods of time to effect substantially complete dehydration of ethyl alcohol to ethylene at temperatures well below 300° C. The ethylene formed is free from carbon monoxide, and the products of other side reactions are diminished to such an extent that they cannot be detected in the gas with certainty by ordinary methods of analysis.

The improved catalyst may be prepared by reacting a solution of sodium silicate with a suitable acid in the presence of a soluble salt of aluminum. In this manner, the gel is produced and is subsequently dried to afford a catalyst suitable for use in the method. As an example of the method of preparing the catalyst, I may dilute 156 cc. of commercial sodium silicate solution with 1400 cc. of water. To this solution is added 550 cc. of a normal solution of $HNO_3$ after which another solution containing 31 grams of $Al(NO_3)_3.9H_2O$ is added. There should be a slight excess of nitric acid. After the gel is formed, it is washed until the wash water gives no test for nitrates. After this, the gel is air dried at room temperature for about 24 hours, then at 80° C. for about 24 hours. The resulting catalyst is charged into the reaction tube, and nitrogen is passed over it while it is slowly heated to the reaction temperature. A catalyst prepared in this manner will ordinarily contain about 2% of $Al_2O_3$.

It will be understood that the foregoing example is merely illustrative. The proportions of silica and alumina in the catalyst may be varied over a wide range, and the exact proportions are not critical. Furthermore, the procedure as described is subject to numerous variations which will readily occur to the chemist, and the quantities used will depend upon the total amount of catalyst to be prepared.

I have discovered, moreover, that thoria may be substituted for alumina in the catalyst, in which case a compound of thorium is substituted for the compound of aluminum in preparing the catalyst. The proportions, as in the case of alumina, are not critical. I have used from a few per cent up to about 10% thorium oxide in the catalyst and have obtained satisfactory results. Undoubtedly, much greater amounts of thorium oxide may be used if desired.

It has also been found that catalysts containing alumina or thoria combined with silica may be mounted upon a suitable support such as pumice or other refractory materials ordinarily employed as carriers for catalysts, provided that the carrier itself has no adverse effect upon the reaction. In this manner an economy may be effected in the preparation of the catalyst and greater mechanical strength may be obtained by using such carriers.

In carrying out the invention, I may employ any suitable apparatus, for example the apparatus illustrated in the drawing, in which a supply of alcohol to be dehydrated is maintained in a storage tank 1. The alcohol is withdrawn through a pipe 2 and is admitted through a valve 3 into a boiler 4 which is supplied with heat by means of a coil 5. Steam or any other suitable heating medium may be maintained in the coil. The alcohol is vaporized and passes through a pipe 6 and superheater 7 where additional heat is supplied by means of steam or any other suitable heating agent, and thence through a pipe 8 to the reaction chamber 9. The catalyst, as previously described, is disposed in tubes 9' within the reaction chamber 9. The tubes are surrounded by vapors of a suitable heating medium, preferably a high boiling heat transfer material such as diphenyl or diphenyl oxide. The temperature of the catalyst can be maintained at the desired point by such vapors. The temperature of the heat transfer material is maintained at the lowest temperature that will give substantially complete conversion of the alcohol.

The condensed vapors of the heat transfer material are withdrawn from the reaction chamber 9 through a pipe 10 and pump 11 and are circulated by means of the pump through a heating coil 12' within a furnace 12. The material within the heating coil is heated to the desired temperature by heating gases supplied in any suitable manner, for example by an oil burner 19. The vapors from the heating coil pass through a pipe 13 to the reaction chamber.

As the alcohol vapors pass through the catalyst within the tubes 9', they are converted to the corresponding olefin gas which, together with the steam or water vapor resulting from the dehydration of the alcohol, escapes through a pipe 14 to a cooler 15 where the greater portion of the water vapor is condensed. The liquid water is separated from the gas in a separator 16 and is withdrawn through a valve 17. The condensate will contain in addition to the water formed by the reaction, any alcohol which passes through the catalyst unconverted.

The olefin gas now free from condensible material passes through the pipe 18 to a gas holder (not shown) in which it may be stored before being utilized or compressed in the cylinders for transportation.

While reference has been made more particularly to the production of ethylene from ethyl alcohol, the method and catalyst may be used similarly to produce other olefins as, for example, propylene from propyl or iso-propyl alcohols, butylenes from butyl alcohols, and in general for reactions involving a hydration or dehydration step in either gaseous or liquid phase where a solid catalyst of the type described may be employed.

Although catalysts of the type described have a remarkably long life in continuous operation, they do eventually, as would be anticipated, lose some of their original activity due to the deposition of carbon or tar upon the highly active surface. Under this condition the tendency to suppress side reactions diminishes.

I have found that the ordinary method of restoring activity of catalysts by the passage of air or oxygen over the catalyst at a temperature of 400° C. will not restore the initial activity of the catalyst used in the method herein described. Steam is likewise ineffective. Temperatures above 400° C. are not readily practicable because of the limitation of the permissible temperature of the heat transfer fluid which is used.

I have discovered, however, that the passage of a mixture of steam with air or oxygen over the catalyst gives unusual results in that the carbon or tar is removed to such an extent that the original activity of the catalyst is fully restored. Thus, when the catalyst has become less active after prolonged use, it is quickly returned to its initial active condition by passing a mixture of steam with air or oxygen through the catalyst without removing it from the tubes, the desired temperature being maintained by continuing the circulation of the vapors of diphenyl or diphenyl oxide as in the practice of the dehydration method. Such restoration by so simple a procedure is an important factor in the successful commercial operation of the method, since the useful life of the catalyst may be prolonged indefinitely.

The advantages of the invention have been fully demonstrated in practical operation by comparable tests under similar conditions employing a commercial type of alumina catalyst alone and silica gel alone. Neither of these materials is capable of producing the improved results of the mixed catalyst as herein described.

Table I shows the performance of a commercial type of alumina catalyst. The data shown were obtained by passing 60–65 grams per hour of alcohol vapor through a 1-inch diameter tube containing 500 cc. of the catalyst. The various temperatures shown were maintained by using diphenyl oxide as a heat transfer fluid in an apparatus such as is hereinbefore described. The gas purity shown represents the fraction of the gas which could be absorbed in bromine water.

*Table I.—Alumina catalyst*

| Temp., °C. | Conversion of alcohol, per cent | Gas purity, per cent |
|---|---|---|
| 275 | 0.0 | |
| 290 | 1.4 | 80.0 |
| 295 | 1.4 | 85.0 |
| 315 | 9.6 | 98.0 |
| 330 | 28.9 | 99.2 |
| 350 | 54.2 | 98.9 |
| 360 | 72.5 | 98.6 |
| 370 | 81.7 | 98.2 |
| 380 | 89.5 | 98.2 |

In Table II, the results obtained in attempting to use silica gel alone are shown. The conditions were those already described in connection with the test of the alumina catalyst.

*Table II.—Silica gel catalyst*

| Temp., °C. | Conversion of alcohol, per cent | Gas purity, per cent |
|---|---|---|
| 275 | 0.0 | |
| 290 | 0.0 | |
| 295 | 0.0 | |
| 315 | 0.0 | |
| 330 | 5.6 | |
| 350 | 10.1 | 95.4 |
| 360 | 12.6 | 95.0 |
| 370 | 16.8 | 95.2 |
| 380 | 22.4 | 94.3 |

The results obtainable with the improved catalyst prepared as hereinbefore described are shown in Table III.

Table III.—Mixed alumina-silica gel catalyst

| Temp., °C. | Conversion of alcohol, per cent | Gas purity, per cent |
| --- | --- | --- |
| 275 | 64.4 | 99.8 |
| 290 | 95.3 | 99.7 |
| 295 | 100.0 | 99.7 |
| 315 | 100.0 | 99.7 |
| 330 | 100.0 | 99.7 |
| 350 | 100.0 | 99.6 |
| 360 | 100.0 | 99.7 |
| 370 | 100.0 | 99.6 |
| 380 | 100.0 | 99.6 |

A comparison of the results given in Table III using the improved catalyst with those of Table I using an alumina catalyst illustrates the benefit obtained by the use of the improved catalyst. Under conditions which gave less than 2% conversion of alcohol, using alumina, and a bromine absorption purity of only 85% of the gas produced, the improved catalyst gave complete conversion of the alcohol with a bromine absorption purity of 99.7. Even under best conditions the gas obtained using alumina contains about 0.5 to 1.0% hydrogen, and other gases which could not readily be condensed at the temperature of liquid air. Analysis by low temperature distillation of the gas shows 0.5 to 1.0% ethane and about the same amount of butylenes and other ethylene polymers. Furthermore, this gas contains carbon monoxide in amount sufficient to make it unfit for use as an anaesthetic.

The gas obtained by using the improved catalyst is free from carbon monoxide and contains little or no hydrogen or non-condensible impurities other than oxygen or nitrogen. Analysis of this gas by low temperature distillation shows that the total amount of impurities such as ethane, butylene, etc., is not greater than about 0.25%, an amount so small that it could not be detected with certainty.

The results shown in Table III are typical of results obtained with the catalyst prepared as described. I have also obtained good results with amounts of alumina in the finished alumina silica gel up to 10–15% by weight of the finished catalyst. Undoubtedly much greater amounts of alumina can be used if desired.

In substituting thoria for alumina, in amounts up to about 10% or more of the weight of the finished catalyst, I have attained excellent results. The catalysts consisting of a mixture of silica and thoria give substantially complete conversion of the alcohol and produce a gas of very high purity giving a bromine absorption equivalent of about 99.7% with only a very small quantity of gases having a boiling point higher than ethylene.

Various changes may be made in the details of procedure and in the proportions of the constituents in the catalyst, as well as in the method of operation and the apparatus used, without departing from the invention or sacrificing any of the advantages thereof.

I claim:
1. The method of dehydrating alcohols to produce corresponding olefins which comprises passing vapors of the alcohol over a catalyst consisting of a gel composed of a mixture of silica and an oxide of an element selected from the group consisting of aluminum and thorium.
2. The method of dehydrating alcohols to produce corresponding olefins which comprises passing vapors of the alcohol over a catalyst consisting of a gel composed of a mixture of silica and an oxide of an element selected from the group consisting of aluminum and thorium, at a temperature of approximately 300° C.
3. The method of dehydrating alcohols to produce corresponding olefins which comprises passing vapors of the alcohol over a catalyst consisting of a gel composed of a mixture of silica and an oxide of an element selected from the group consisting of aluminum and thorium, at a temperature between 295° and 350° C.
4. The method of dehydrating alcohols to produce corresponding olefines which comprises passing vapors of the alcohol over a catalyst consisting of a gel composed of a mixture of silica and an oxide of aluminum.
5. The method of dehydrating ethyl alcohol to produce ethylene which comprises passing the vapor of the ethyl alcohol over a catalyst consisting of a gel composed of a mixture of silica and an oxide of aluminum, at a temperature between 290° and 380° C.

HOKE S. MILLER.